(12) United States Patent
Shimoda

(10) Patent No.: US 6,535,345 B1
(45) Date of Patent: Mar. 18, 2003

(54) SIGNAL PROCESSING APPARATUS AND SIGNAL PROCESSING METHOD

(75) Inventor: Kaneyasu Shimoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/546,473

(22) Filed: Apr. 10, 2000

(30) Foreign Application Priority Data

Jul. 21, 1999 (JP) .......................... 11-206774

(51) Int. Cl.$^7$ .............................. G11B 5/09
(52) U.S. Cl. .................... 360/65; 360/46; 375/262; 375/341; 714/794
(58) Field of Search .................. 360/65, 46; 375/262, 375/341; 714/794, 795

(56) References Cited

U.S. PATENT DOCUMENTS

| | | | | |
|---|---|---|---|---|
| 5,583,705 A | * | 12/1996 | Ziperovich et al. | 360/45 |
| 5,661,760 A | * | 8/1997 | Parapoutian et al. | 375/341 |
| 5,729,517 A | * | 3/1998 | Fujiwara et al. | 369/59.22 |
| 5,916,315 A | * | 6/1999 | Ryan | 714/7 |
| 6,097,769 A | * | 8/2000 | Sayiner et al. | 375/262 |

FOREIGN PATENT DOCUMENTS

| | | |
|---|---|---|
| JP | 730438 | 1/1995 |
| JP | 9147312 | 6/1997 |

OTHER PUBLICATIONS

Roger W. Wood et al.; Viterbi Detection of Class IV Partial Response on a Magnetic Recording Channel; *IEEE Transactions on Communications*; vol. COM–34, No. 5, May 1986.

Hisashi Kobayashi; "Correlative Level Coding and Maximum–Liklihood Decoding"; *IEEE Transactions on Information Theory*; vol. IT–17, No. 5, Sep. 1971.

* cited by examiner

*Primary Examiner*—Regina N. Holder
*Assistant Examiner*—Varsha A. Kapadia
(74) *Attorney, Agent, or Firm*—Greer, Burns & Crain, Ltd.

(57) ABSTRACT

In a signal processing apparatus according to the present invention employing PRML technology to reproduce a code sequence recorded on a magnetic recording medium, the maximum likelihood code sequence of a readback signal is obtained by using a likelihood function based on a conditional distribution of each branch corresponding to a quantization level. A plurality of conditional distributions having various deviations are provided, and a suitable conditional distribution is selected in accordance with the characteristic of the readback signal, the signal reproduction performance can be improved. Especially set is a conditional distribution for the nonlinear phenomenon, such as the nonlinear transition shift (NLTS) and the partial erasure (PE). Therefore, it is possible to prevent the signal processing performance deterioration, caused by the nonlinear phenomenon, which tends to appear more often in consonance with the increase in the recording density of a magnetic recording medium. In addition, the recording density for a magnetic recording medium can be increased.

5 Claims, 5 Drawing Sheets

SIGNAL PROCESSING APPARATUS AND SIGNAL PROCESSING METHOD

BACKGROUND OF THE INVENTION

1. Field of the Invention

The present invention relates to a signal processing apparatus and a signal processing method for detecting a digital signal, and relates in particular to a signal processing apparatus and a signal processing method which employs PRML (Partial Response Maximum Likelihood detection) technology for a magnetic recording system.

2. Related Arts

A code sequence reproduction method employing PRML (Partial Response Maximum Likelihood) technology is well known in magnetic recording. PRML technology integrates maximum likelihood detection with a PR channel and Viterbi detecting method which is used for error correction. The PR method is the transmission method for which efficient code transmission is enabled by permitting a wave on the reception side to use a form of intersymbol interference. In accordance with the form of the intersymbol interference that is used, the PR system comprises a plurality of types: PR class 4 with polynomial $1-D^2$ and EPR (Extended Partial Response) class 4 with polynomial $1+D^2-D^3$. The PR class 4 and its extended class (EPR class 4) are mainly employed for magnetic recording system, such as magnetic disks.

The Viterbi detecting is one of the maximum likelihood detecting used for error correction on the PR channel. With this method, the intersymbol interference applied by the PR channel is employed to correct errors in a signal read from a recording medium. Specifically, as the read signal has the intersymbol interference, correlative patterns are produced for a code sequence obtained by sampling the signal. Therefore, errors can be detected by comparing the correlative patterns with the actual sampling results, and to perform this comparison and find the pattern which most closely resembles the sampling results, the Viterbi detecting method is used.

The PRML technology is described in detail in, for example, "Correlative level coding and maximum-likelihood decoding", Hisashi Kobayashi, IEEE Transactions in Information Theory, vol. IT-17, NO.5 pp586–594, September 1971, and "Vitervi Detection of Class IV Partial Response on Magnetic Recording Channel", Roger W. Wood and David A. Petersen, IEEE Transactions on Communications, vol. COM-34, NO.5 pp454–461, May 1986.

FIG. 8 is a block diagram showing a conventional signal processing apparatus. In FIG. 8, the equalizer 3 receives a readback signal and equalizes (alters the shape of) the received signal to produce a signal having a predetermined PR characteristic (e.g., PR class 4: PR4). Then, an analog-digital (A/D) converter repeatedly samples the PR equalized signal and converts into a quantized signal which is subsequently transmitted to a maximum likelihood detector 10. Available to the maximum likelihood detector 10 are all the branch node combinations provided by the intersymbol interference characterized by PR4 channel. FIG. 8 shows trellis diagram of the Viterbi detector. There are two nodes and four kind of branch transmissions: (1) node M+ to node M+; (2) node M+ to node M−; (3) node M− to node M+; and (4) node M+ to node M−. The node M+ and the node M− represent the opposite magnetization directions of individual bits on the recording medium.

The conventional maximum likelihood detector calculates the Euclid distance between the output of A/D and an expected value of +1, 0 or −1 for the PR4, and selects a branch for which the Euclid distance is the smallest. Assuming that a sampling signal level is y, the Euclid distance takes values $(y-1)^2$, $y^2$ or $(y+1)^2$. For example, when Euclid distance $y^2$ is the smallest in the current node M+, the next node is also node M+, i.e., the branch (1) above. When Euclid distance $(y+1)^2$ is the smallest, the next node is M−, i.e., the branch (2). Because of the PR4 characteristics, Euclid distance $(y-1)^2$ is never the smallest when the current node is M+. Furthermore, when Euclid distance $y^2$ is the smallest in the current node M−, the next node is also M−, i.e., the branch (4). When Euclid distance $(y-1)^2$ is the smallest, the next node is M+, i.e., the branch (3). Because of the PR4 characteristics, Euclid distance $(y+1)^2$ is never the smallest when the current node is M−. When a branch is selected, such as (2), node M+ to node M−, or (3), node M− to node M+, for which magnetic transition occurs, code "1" in a code sequence is reproduced. When a branch is selected, for which magnetic transition does not occur, such as (1), node M+ to node M+, or (4), node M− to node M−, code "0" in a code sequence is reproduced. The code sequence which is reproduced in this manner is the most likely code sequence.

However, as the recording density is increased, a nonlinear transition shift (NLTS) that a magnetic transition location is affected by an adjacent magnetic transition location and is shifted, and a partial erasure (PE) that two transition carrying opposite magnetic charges locally annihilate each other, tend to occur. That is, in the situation where these nonlinear phenomena occur, the levels which correspond to sequential magnetic transitions at adjacent magnetic transition locations are not always accurately read. Since the Euclid distance does not consider the nonlinear phenomena (NLTS and PE), the code sequence selected based on the Euclid distance by the maximum likelihood detector 10 is not always the most likely code sequence, and performance of the maximum likelihood detector 10 is degraded.

SUMMARY OF THE INVENTION

It is, therefore, one objective of the present invention to provide a signal processing apparatus and a signal processing method for precisely detecting a signal read from a magnetic recording medium, even when a nonlinear phenomenon occurs in the channel.

To achieve the above objective, according to the present invention, when the PRML technology is employed to reproduce a code sequence recorded on a magnetic recording medium, the maximum likelihood code sequence of a readback signal is obtained by using a likelihood function based on a conditional distribution of each branch corresponding to a quantization level. A plurality of conditional distributions having various deviations are provided, and a suitable conditional distribution is selected in accordance with the characteristic of the readback signal, the signal reproduction performance can be improved. Especially set is a conditional distribution for the nonlinear phenomenon, such as the nonlinear transition shift (NLTS) and the partial erasure (PE). Therefore, it is possible to prevent the signal processing performance deterioration, caused by the nonlinear phenomenon, which tends to appear more often in consonance with the increase in the recording density of a magnetic recording medium. In addition, the recording density for a magnetic recording medium can be increased.

To achieve the above objective of the present invention, there is provided a signal processing apparatus for converting a signal read from a recording medium by using magnetic recording into a code sequence, comprising:

an equalizer for equalizing the read signal to obtain a signal having a predetermined equalization characteristic;

a quantizing unit for obtaining a quantization level of the equalized signal with each sampling timing; and a maximum likelihood detector for determining a likelihood code sequence by using a likelihood function based on conditional distributions of each branch corresponding to the obtained quantization level, each of the conditional distributions being defined by a channel equalization characteristic.

With this arrangement, the conditional distribution can be optimized dynamically and the signal reproduction performance can be improved.

It is preferable that a plurality of conditional distributions having various deviations are provided for each of branches that the magnetic transition occurs; and said maximum likelihood detector selects one of the plurality of conditional distributions based on judging whether or not the magnetic transition occurs in an branch at least immediately before.

As a result, in case that the nonlinear phenomenon is included in the read channel, the deterioration of signal process performance can be prevented.

Further, for example, provided are a plurality of conditional distributions having various deviations corresponding to the characteristic of the readback signal, such as a conditional distribution corresponding to error rate and a conditional distribution according to the length of code "0", in case that the signal conforms to the rule for run length limited (RLL) code. As a result, the signal reproduction performance can be improved.

Furthermore, to achieve the objective of the present invention, there is provided a signal processing method for converting a signal read from a recording medium by using magnetic transition into a code sequence, comprising the steps of:

equalizing the read signal to obtain a signal having a predetermined equalization characteristic;

obtaining a quantization level of the equalized signal with each sampling timing; and determining a likelihood code sequence by using a likelihood function based on conditional distributions of each branch corresponding to the obtained quantization level, each of the conditional distributions being defined by the channel equalization characteristic.

DETAILED DESCRIPTION OF THE PREFERRED EMBODIMENT

The preferred embodiment of the present invention will now be described. It should be noted, however, that the technical scope of the present invention is not limited to this embodiment.

Figure 1:
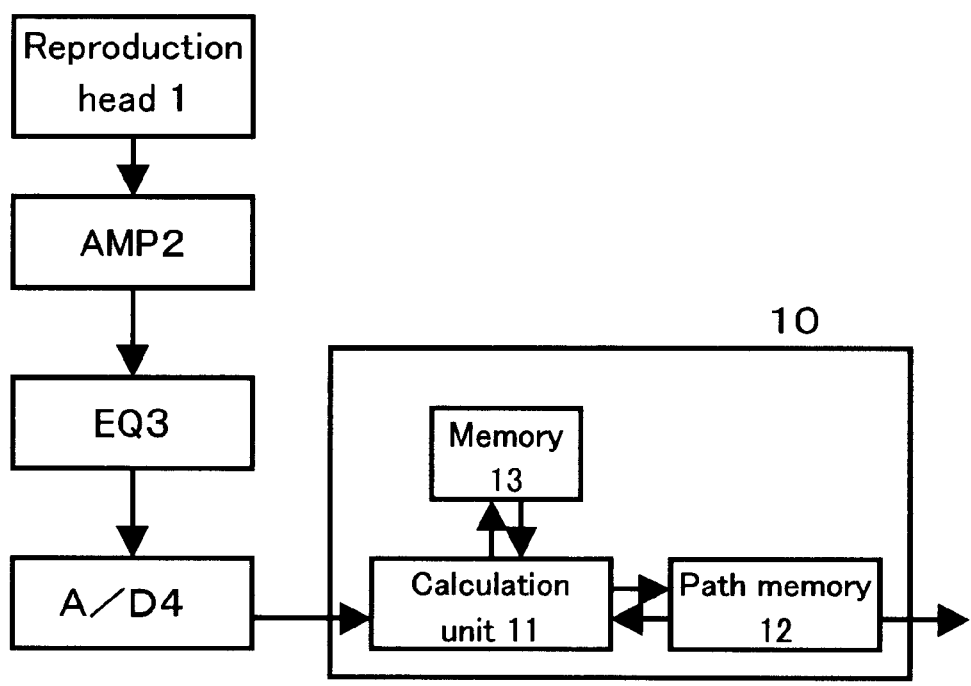
FIG. 1 is a block diagram illustrating the arrangement of a signal processing apparatus according to one embodiment of the present invention.

FIG. 1 is a block diagram illustrating the arrangement of a signal processing apparatus according to the embodiment of the present invention. The signal processing apparatus in FIG. 1 processes a signal read from a magnetic recording medium (magnetic disk). In FIG. 1, readback signal is amplified by a head amplifier (AMP) 2 and transmitted to an equalizer (EQ) 3. The output signal from the equalizer 3 is sampled and converted into quantized signal by an analog-digital (A/D) converter 4. Subsequently, the quantized signal is transmitted to a maximum likelihood detector (ML) 10. The maximum likelihood detector 10 comprises a calculation unit 11 for performing for this embodiment a predetermined calculation, a shift register 12 which is a path memory for storing a plurality of code sequences, and a conditional distribution table (memory) 13. The calculation unit 11 refers the conditional distribution table 13, and determines the likelihood code sequence. The history for code sequences is stored in the path memory 12. When the calculation unit 11 determines that code sequences are wrong, the pertinent code sequence is erased and the remaining code sequence is output by the maximum likelihood detector 10 as the most likely code sequence. The calculation unit 11 selects the most appropriate conditional distribution from the conditional distribution table 13.

Figure 2:
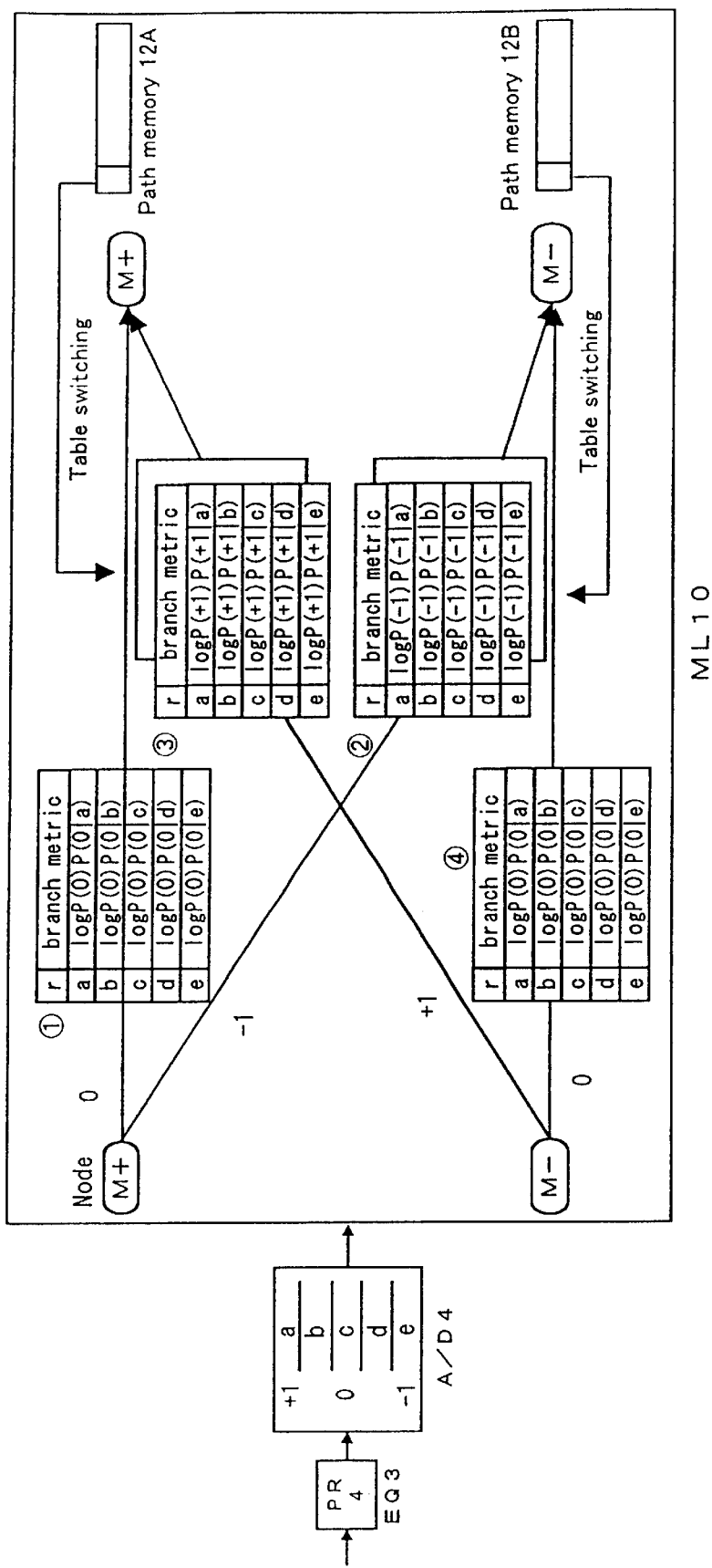
FIG. 2 is a diagram illustrating the signal processing apparatus according to the embodiment of the present invention.

FIG. 2 is a trellis diagram illustrating the signal processing apparatus according to the embodiment of the present invention. The equalizer 3 processes a readback signal to the PR4 characteristics. The PR equalized signal is then converted by the A/D 4 into a quantized signal having a quantization level(each of level a, b, c, d and e). The quantized signal is transmitted to the maximum likelihood detector 10. There are four branches in the PR4: (1) node M+ to node M+; (2) node M+ to node M−; (3) node M− to node M+; and (4) node M− to node M−. Node M+ and node M− represent the opposite magnetization directions of individual bits on the magnetic recording medium.

The maximum likelihood detector 10 in this invention uses a log-likelihood function based on the conditional distribution instead of the conventional Euclid distance. The log-likelihood function will be explained later.

Figures 3A, 3B, 3C:
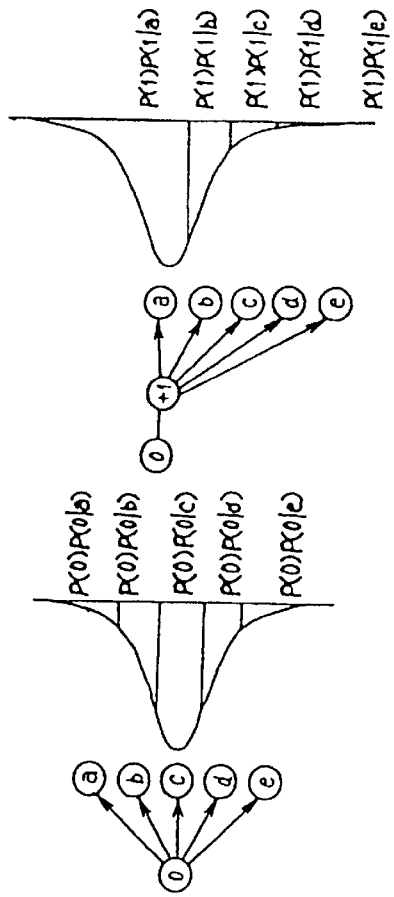
FIGS. 3A, 3B and 3C are diagrams showing example likelihood functions.

FIGS. 3A, 3B and 3C are diagrams showing conditional distributions. Each of the conditional distributions is a conditional distribution that the quantization level is an ideal PR4 signal value of −1, 0 or +1. FIG. 3A shows the conditional distribution at the ideal PR4 signal value of −1. FIG. 3B shows the conditional distribution at the ideal PR4 signal value of 0. FIG. 3C shows the conditional distribution at the ideal PR4 signal value of +1. In this example, when level y of a digital signal transmitted to the maximum likelihood detector 10 is y∈{a, b, c, d, e}, and when the i-th expected value Xi is Xi∈{−1, 0, +1}, a conditional distribution P (Xi|y) that the expected value Xi is level y is represented by the following equation:

$$P(Xi|y) = P(Xi)P(y|Xi)/\{\Sigma P(Xi)P(y|Xi)\} \qquad (1),$$

where P(Xi) term is the probability of transmitting of the value Xi, and conditional distribution P(y|Xi) is a conditional channel probability. In the memo-less symmetric transmission channel, equation (1) can be rewritten simply as:

$$P(Xi|y)=P(Xi)P(y|Xi) \qquad (2).$$

Conditional distribution P(Xi|y) is represented by an area ratio corresponding to each level y relative to the overall area of the conditional probability in FIGS. 3A, 3B, or 3C.

When, for example, the signal of level b is input, the probability that the signal will have an expected value of −1, 0 or +1 corresponds to the area of conditional distribution P(−1|b), P(0|b) or P(+1|b) in FIGS. 3A, 3B or 3C. That is, when the signal of level b is input, the probability that the signal is the expected value of +1 is the highest, and the probability that the signal is the expected value of −1 is the lowest.

In this embodiment, a likelihood function is represented by multiplication of the conditional distributions P(Xi|y) corresponding to each of level y. The maximum likelihood detector 10 multiplies the conditional distributions obtained for individual levels, and determines that a code sequence for which the likelihood function is the highest is the most likely code sequence. By representing conditional distribution P(Xi|y) using logarithm "log", the log-likelihood function is represented by addition of the conditional distributions. The likelihood code sequence can be obtained by the addition of log-conditional distributions logP. Therefore, in this embodiment, the log-conditional distribution logP shown in FIG. 2 is established as a table in the memory 13 (see FIG. 1) of the maximum likelihood detector 10.

In FIG. 2, if the level for an input signal is a, b, c, d or e, the log-conditional distribution when the current node M+ is branched to the node M+, i.e., an expected value will be 0 when no magnetic transition occurs, is logP(0|a), logP(0|b), logP(0|c), logP(0|d) or logP(0|e). The same reasoning is applied for the conditional distribution for the branch when the current node M− is branched to the node M−. Further, if the level for an input signal is a, b, c, d or e, the conditional distribution for the branch when, due to the occurrence of a magnetic transition, the current node M+ is branched the node M−, i.e., the conditional distribution of an expected value of −1, is conditional distribution logP(−1|a), logP(−1|b), logP(−1|c), logP(−1|d) or logP(−1|e). In addition, if the level for an input signal is a, b, c, d or e, the conditional distribution for the branch when, due to the occurrence of magnetic transition, the current node M− is branched to the node M+, i.e., the conditional distribution of an expected value of +1, is conditional distribution logP(+1|a), logP(+1|b), logP(+1|c), logP(+1|d) or logP(+1|e).

In this manner, the maximum likelihood detector 10 calculates log-likelihood function in accordance with the level, and selects the maximum likelihood sequence.

In the embodiment of the present invention, conditional distributions having various deviations, in accordance with the history of magnetic transition for a branch, are provided corresponding to expected values of +1, 0 and −1.

Figure 4:
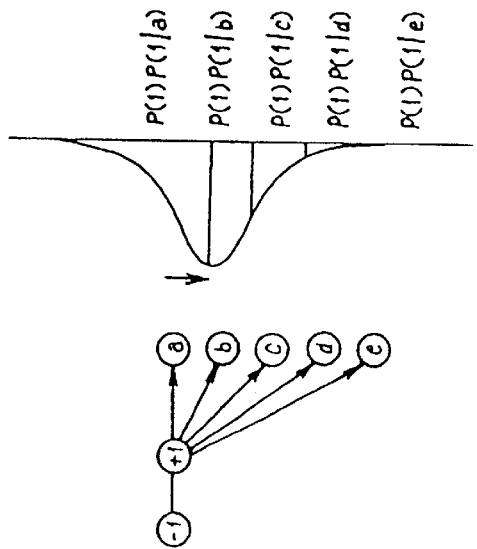
FIG. 4 is a diagram showing another example likelihood function.

FIG. 4 is showing another example of the conditional distribution. Specifically, according to the conditional distribution in FIG. 4, the node M+ is branched to node M− at the branch immediately before (i.e., an expected value of −1), and when magnetic transition occurs, the node M− is further branched to the node M+ (i.e., an expected value of +1). Therefore, the conditional distribution in FIG. 4 is another example of the conditional distribution in FIG. 3C.

When magnetic transition has occurred at the branch immediately before, as is described above, the occurrence possibility that the nonlinear phenomenon, such as the nonlinear transition shift (NLTS) and the partial erasure (PE) is increased. Therefore, even when magnetic transition occurs at a succeeding branch, the possibility that the amplitude of a level signal will be reduced is high. That is, when magnetic transition occurs, as is shown in FIG. 3C, normally the possibility that level y of a signal will be a level which is near each expected value is the highest, and the conditional distribution has a sharp peak at a level which is near an expected value.

However, in a situation where the nonlinear phenomenon situates, the amplitude of a level signal is reduced, when transition interval is narrow. Therefore, the conditional distribution in FIG. 3C, whereat a signal at level e is output, is relatively lower. Thus, a likelihood function in FIG. 4 is prepared for which, compared with FIG. 3C, the peak level is reduced and the peak position is shifted toward level b, and the overall shape is blunter. At this time, the area of the conditional distribution in FIG. 4 is equal to the area of the conditional distribution in FIG. 3C. Since the conditional distribution having such a shape is provided, the probability that the occurrence of magnetic transition will be detected can be increased, even when the amplitude of a signal level is reduced due to the occurrence of the nonlinear phenomenon.

Also, although not shown, in the conditional distribution that the expected value will be +1 at the branch immediately before, and that the expected value will be −1 at the succeeding branch, the peak level is reduced, the peak position is shifted toward level d in compared with the conditional distribution in FIG. 3A,, and the overall shape of the conditional distribution is blunter.

As is described above, according to the embodiment of the present invention, the maximum likelihood sequence is determined using the likelihood function based on the conditional distribution. Provided are the conditional distributions for the individual branches, each having a different deviation in accordance with a branch at an adjacent magnetic transition location (the occurrence/no occurrence of magnetic transition at the branch immediately before). Depending on whether the magnetic transition occurs at the branch immediately before, an optimal conditional distribution is selected. In other words, the calculation unit 11 of the maximum likelihood detector 10 selects the optimal conditional distribution. Thus, the precision of the most likely code sequence is improved.

The maximum likelihood detector 10 includes a plurality of path memories 12 (see FIG. 1) for storing the determination results. The path memory 12 is constituted, for example, by a selector and a shift register, and stores the occurrence/non-occurrence of magnetic transition at a branch. In a case of the PR class 4 equalization, the maximum likelihood detector 10 includes the path memories 12A and 12B (see FIG. 2). The path memory 12A stored temporarily the occurrence/non-occurrence of magnetic transition while node M+ is employed as a reference. The path memory 12B stores temporarily the occurrence/non-occurrence of magnetic transition while node M− is employed as a reference. The lengths of code sequences stored in the path memories 12A and 12B depend on the length of an error propagation performed in accordance with a code and a equalization system.

A code sequence consisting of 0s or 1s is provided in the path memory. In a case where there is a branch from node M+ to node M+, i.e., a branch (1) whereat no magnetic transition occurs, a code "1" is stored in the path memory 12A corresponding to node M+ and copied to the path memory 12B. In a case where there is a branch from node M− to node M+, i.e., a branch (3) whereat magnetic transition occurs, a code "1" is stored in the path memory 12A. In a case where there is a branch from node M− to node M−, i.e., a branch (4) whereat no magnetic transition occurs, a code "0" is stored in the path memory 12B corresponding to node M−. In a case where there is a branch from node M+ to node M−, i.e., a branch (2) whereat magnetic transition occurs, a code "1" is stored in the path memory 122B. It should be noted that for branch (1) or for branch (3) the same code as is stored in the path memory 12A is copied to the path memory 12B; and that, for branch (2) or for branch (4) the same code as is stored in the path memory 12B is copied to the path memory 12A.

In this manner, the past magnetic transition history is stored in the path memories 12A and 12b, and the maximum likelihood detector 10 determines whether magnetic transition occurred at the branch immediately before from the codes in the path memories 12A and 12b. In case that magnetic transition has not occurred, the conditional distribution in FIG. 3 is selected. In case that magnetic transition has occurred, the conditional distribution in FIG. 4 for the occurrence of the nonlinear phenomenon is selected.

Figure 5:
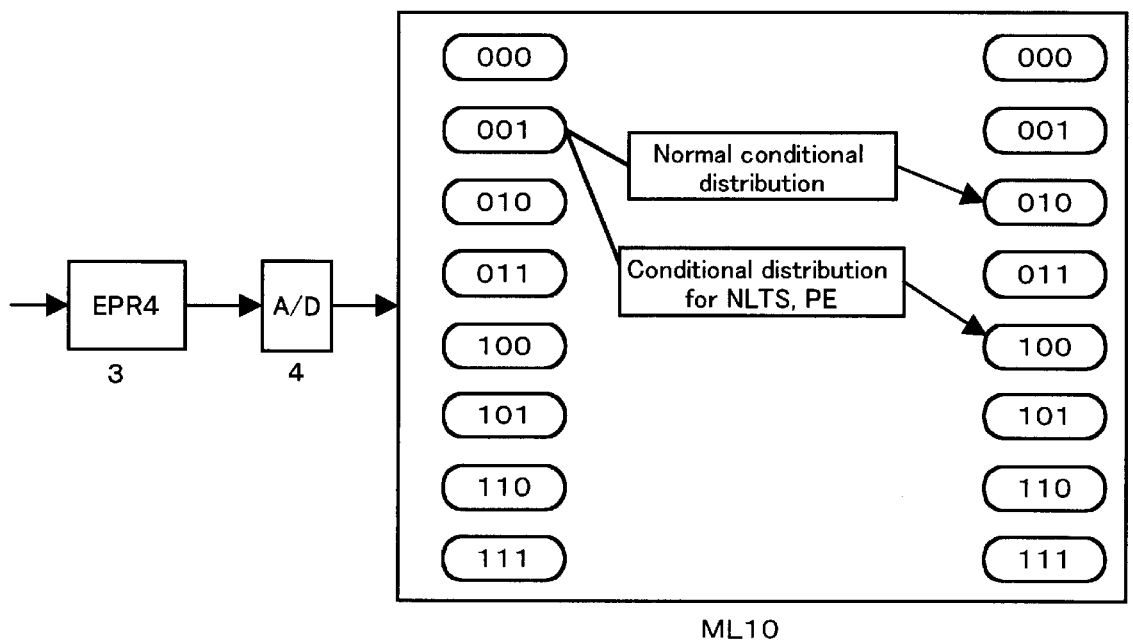
FIG. 5 is a diagram showing a maximum likelihood detecting unit in the signal processing apparatus for which EPR class 4 is employed.

FIG. 5 is a diagram showing the signal processing performed by the maximum likelihood detector 10 when EPR4 (Extended PR class 4) is employed for PR equalization. In EPR4, the following eight nodes are required instead of the nodes M+ and M− required for PR4. These nodes are combinations of histories associated with the occurrence/non-occurrence of magnetic transition back to the three preceding branches. When a magnetic transition occurs, it is represented in the history by a "1", and when a magnetic transition does not occur, it is represented in the history by a 0. For example, a history node "001", indicates that, reading backward, a magnetic transition occurred at the first preceding branch (the branch immediately before) but that no magnetic transition occurred at either the second and the third preceding branches. Therefore, when magnetic transition does not occur at the succeeding branch, the node "001" is changed to the node "010," or when magnetic transition occurs at the succeeding branch, the node "001" is changed to the node "011." In a case where the node branches from "001" to "010" when no magnetic transition occurs, or in a case where the node branches from "000" to "001" when a magnetic transition occurs and if the last code is "0" (no magnetic transition), the maximum likelihood detector 10 selects the normal conditional distributions shown in FIG. 3. In a case where the node branches from "001" to "011" when a magnetic transition occurs and if the last code is also "1" (occurrence of a magnetic transition), the maximum likelihood detector 10 selects the conditional distribution for the occurrence of a nonlinear phenomenon in FIG. 4.

Figure 6:
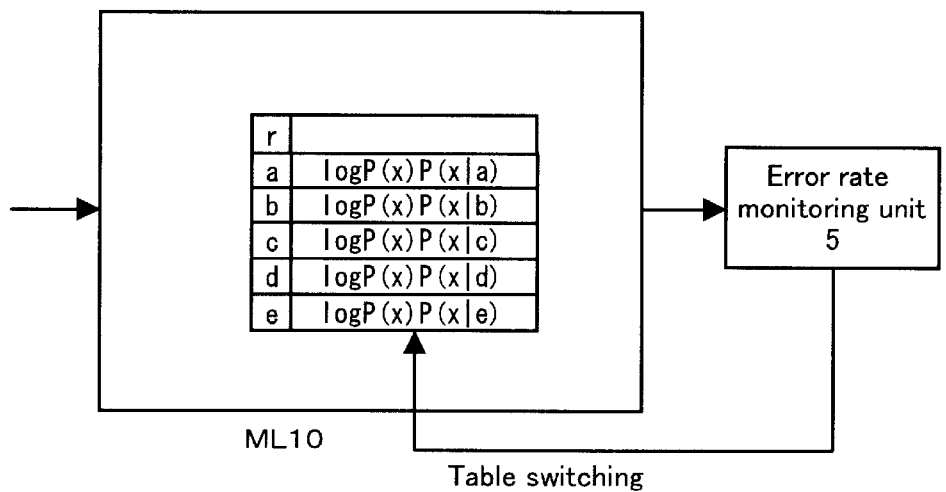
FIG. 6 is a diagram showing the signal processing apparatus which includes an error rate monitoring unit.
Figure 7:
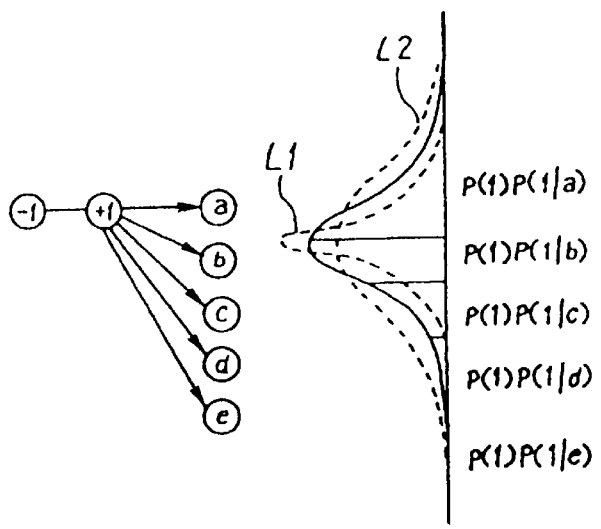
FIG. 7 is a diagram showing an example likelihood function having a narrow distribution width and an example likelihood function having a wide distribution width.
Figure 8:
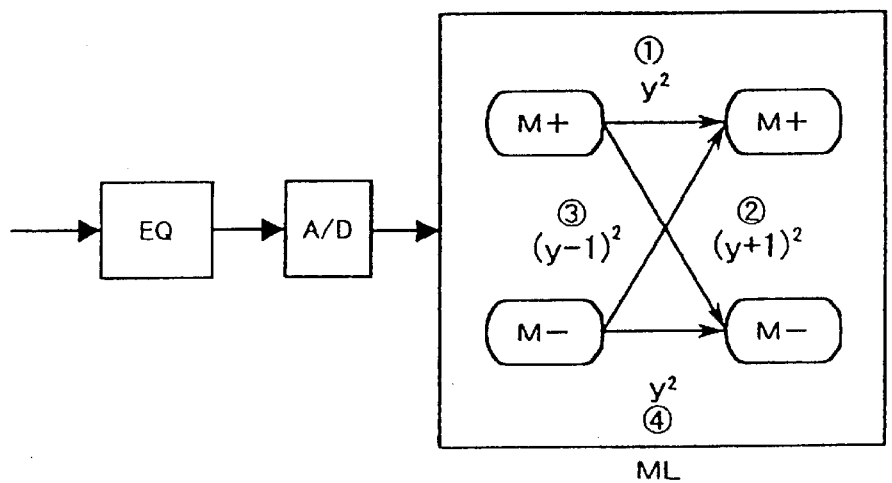
FIG. 8 is a block diagram illustrating a conventional signal processing apparatus.

FIG. 6 is a diagram showing a signal processing apparatus which includes an error rate monitoring unit. The error rate monitoring unit 5 is a circuit for monitoring the error rate for an output signal from the maximum likelihood detector 10. The error rate monitoring unit 5 is a circuit for monitoring a rate wherein the output signal is corrected by using an error correction code which is included in the output signal. The calculation unit 11 of the maximum likelihood detector 10 obtains an error rate from the error rate monitoring unit 5, and selects the optimal likelihood function in accordance with the error rate. Specifically, in addition to the conditional distributions in FIGS. 3 and 4, the memory stores conditional distributions for various deviations FIG. 7 is a diagram showing an conditional distributions L1 having a small deviation, and conditional distribution L2 having a large deviation. In FIG. 7, the conditional distribution having a small deviation than the conditional distribution in FIG. 4 (solid line) is indicated by broken line L1 and the conditional distribution having a large deviation is indicated by broken line L2, and the areas for the individual conditional distributions are the same. At this time, please note that the conditional distributions are not limited those shown here, and may be sorted to provide more types.

When the error rate of the output signal is smaller than a predetermined reference value (e.g., $10^{-9}$), the conditional distribution having a small deviation is selected, and the error rate can be further reduced. When the error rate is equal to or greater than the reference value, the conditional distribution having a large deviation is selected, and the error rate can be reduced to satisfy the reference value.

In the above embodiment, a so-called run length limited (RLL) code is employed as the code to be recorded on a magnetic recording medium. For example, (0,4) RLL code used together with PR4 means that the number (called a run) of "0s" which continuously occur between "1s" in a code sequence is from equal to or greater than 0 to equal to or less than 4. Therefore, in (0,4) RLL code, five or more "0s" do not continuously occur.

According to this RLL code characteristic, when "0s" (no magnetic transition) continuously occur in a code sequence, the conditional distribution of a "1" (a magnetic transition) occurring next is increased. More specifically, for PR4, for example, the probability of a branch whereat magnetic transition occurs, i.e., the probability of an expected value of −1, is increased. Therefore, when, on the right side of equation (1) or (2) described above, probability P(Xi), for an expected value Xi of +1 or −1, is increased, compared with probability P(Xi), for an expected value of 0, the precision at which the maximum likelihood detector 10 obtains the most likely code sequence can be enhanced. As is described above, the maximum likelihood detector 10 may includes tables for conditional distributions whereby probability P(Xi) differs depending on an expected value. And when "0s" are continued in a code sequence, the maximum likelihood detector 10 may select a table for a conditional distribution for which the probability P(Xi) is relatively high for expected values +1 and −1, and is relatively small for expected value 0.

In the above embodiment, the processing for a signal read from a magnetic recording medium has been explained. The present invention can also be applied for another storage medium, such as a magneto-optical recording medium, using magnetic recording.

As is described above, according to the present invention, when the PRML technology is employed to reproduce a code sequence recorded on a magnetic recording medium, the maximum likelihood code sequence of a PR equalized signals is obtained by using a likelihood function based on a conditional distribution of each branch corresponding to the quantization level. A plurality of conditional distributions having various deviations are provided, and a suitable conditional distribution is selected in accordance with the characteristic of the readback signal, the signal reproduction performance can be improved. Especially set is a conditional distribution for the nonlinear phenomenon, such as the nonlinear transition shift (NLTS) and the partial erasure (PE). Therefore, it is possible to prevent the signal processing performance deterioration, caused by the nonlinear phenomenon, which tends to appear more often in consonance with the increase in the recording density of a magnetic recording medium. In addition, the recording density for a magnetic recording medium can be increased.

The scope of the coverage afforded by the present invention is not limited to the above embodiment, and also includes the invention and its equivalent as defined in the claims for the present invention.

What is claimed is:

1. A signal processing apparatus for converting a signal read from a magnetic recording medium into a code sequence, comprising:

an equalizer for equalizing the read signal to obtain an equalized signal having a predetermined equalization characteristic;

a quantizing unit for obtaining a quantization level of the equalized signal with each sampling timing; and a maximum likelihood detector for determining a likely code sequence by using a likelihood function based on conditional distributions of each of a plurality of branches corresponding to the obtained quantization level, wherein the conditional distributions represent a probability that the obtained quantization level corresponds to each of the plurality of branches defined by the equalization characteristic.

2. The signal processing apparatus according to claim 1, wherein a plurality of conditional distributions having various deviations are provided for each of the plurality of branches that a magnetic transition occurs; and said maximum likelihood detector selects one of the plurality of conditional distributions based on judging whether or not the magnetic transition occurs in a branch at least immediately before an adjacent magnetic transition location.

3. The signal processing apparatus according to claim 1, further comprising:

an error rate monitoring unit for monitoring an error rate for the code sequence determined by said maximum likelihood detector, wherein a plurality of conditional distributions having various deviations are provided for each of branches, and said maximum likelihood detector selects one of the plurality of the conditional distributions based on the error rate of the code sequence.

4. The signal processing apparatus according to claim 1, wherein a plurality of conditional distributions having various deviations are provided for each of branches, and said maximum likelihood detector selects one of the plurality of conditional distributions based on the density of zero in the code sequence in case that the code sequence is run length limited (RLL) code sequence.

5. A signal processing method for converting a signal read from a magnetic recording medium into a code sequence, comprising the steps of:

equalizing the read signal to obtain an equalized signal having a predetermined equalization characteristic;

obtaining a quantization level of the equalized signal with each sampling timing; and determining a likely code sequence by using a likelihood function based on conditional distributions of each of a plurality of branches corresponding to the obtained quantization level, wherein the conditional distributions represent a probability that the obtained quantization level corresponds to each of the plurality of branches defined by the equalization characteristic.

* * * * *